United States Patent Office 2,903,332
Patented Sept. 8, 1959

2,903,332

SEPARATION OF RUTHENIUM FROM AQUEOUS SOLUTIONS

Clayton F. Callis and Robert L. Moore, Richland, Wash., assignors to the United States of America as represented by the United States Atomic Energy Commission No Drawing. Application September 7, 1950
Serial No. 183,654

20 Claims. (Cl. 23—14.5)

This invention deals with the removal of ruthenium from aqueous solutions containing uranium values and/or plutonium values and fission product values.

It is an object of this invention to provide an improvement in the separation process for uranium, plutonium and/or fission product values whereby ruthenium and plutonium are oxidized at the same time and by the same means.

Another object of this invention is to provide a process for separating ruthenium from plutonium, uranium and/or other fission product values in which the ruthenium is oxidized without any substantial addition of foreign ions so that no undesirable by-products are formed in the reaction.

It is still another object of this invention to provide a process for separating plutonium, uranium and/or fission product values including ruthenium in which plutonium and ruthenium are simultaneously oxidized without the necessity of adding dichromate in the stoichiometric amount for plutonium oxidation.

It is finally still another object of this invention to provide a process for separating ruthenium from plutonium, uranium and/or fission product values in which oxidation of plutonium, ruthenium and ferrous ions and also volatilization of the ruthenium tetroxide formed are carried out in one single step and by one single means.

These and other objects are accomplished by providing an aqueous solution of the plutonium and/or uranium and fission product values, including ruthenium values, to be separated, oxidizing the plutonium salt formed thereby, contacting said solution with a substantially water-immiscible organic solvent whereby plutonyl salt and/or uranyl salt and fission product salts are extracted into a solvent phase, separating said solvent phase from an aqueous phase, reducing said plutonyl salt in said solvent phase to a trivalent plutonium salt, re-extracting from said solvent phase the trivalent plutonium salt and fission product salts with an aqueous solution containing a salting-out agent to leave the uranium values in the organic phase, introducing ozone into said aqueous acid solution whereby the plutonium values are oxidized to the hexavalent state and ruthenium is oxidized to ruthenium tetroxide and volatilized as such, and optionally repeating the cycle for further separation. The salting-out agent mentioned above may be mineral acid and/or salts thereof.

In the process outlined in the preceding paragraph, it is advantageous to treat the aqueous solution, prior to ozonization, with air in order to drive out residual parts of organic solvent dissolved in the aqueous phase. In the case of hexone, for instance, sparging with air for about thirty minutes at approximately 50° C. has been found successful in the complete volatilization of the hexone from the aqueous phase.

It is preferred that the initial solution be acidic. Nitric acid solutions have been found most advantageous. If nitric acid is used, the uranium is dissolved in its hexavalent state forming uranyl nitrate; in the case of other mineral acids, when no hexavalent salt is obtained immediately, uranium is simultaneously oxidized with the plutonium in the first oxidation step. For this first oxidation step, dichromates, for instance sodium dichromate, are preferred.

For the extraction of the uranium, plutonium and fission product values from the aqueous solution, a great number of organic solvents substantially immiscible with water have been found suitable. For instance, ethers, glycol ethers, esters, ketones, alcohols, alkyl phosphates, nitrohydrocarbons and alkyl sulfides have proved suitable. Methyl isobutyl ketone or hexone is a preferred solvent.

The ozonization step is preferably carried out in the presence of an oxidation catalyst. A great number of substances have been found suitable for this purpose. For instance, water-soluble permanganates, dichromates, silver salts, cerium(IV) salts, cobalt salts, nickel salts, periodates, bromates and lead dioxide have given very good results. Molarities of these catalysts ranging from 0.001 to 0.1 have been used with satisfaction.

While heating of the solution containing the ruthenium is not necessary during the ozone treatment, an elevated temperature up to about 95° C. has been found to accelerate the volatilization of ruthenium tetroxide.

The ozone is preferably introduced in dilute form, for instance, in admixture with oxygen, air, nitrogen or the like. Concentrations of from 0.5 to 5% of ozone in the gas mixture have been found suitable.

It is advisable to carry out the ozonization step in acid solution. Mineral acids, such as sulfuric acid, hydrochloric acid, and nitric acid, are suitable. Studies made on the concentration of the acid show that changes of the molarity do not affect the operativeness or effectiveness of the ozonization.

In the so-called solvent extraction process, used in the recovery of the various elements from neutron-irradiated uranium slugs, ruthenium has always been a complicating factor, because it is extracted together with uranium and together with plutonium and very difficult to separate therefrom. This fact made it necessary for complete ruthenium decontamination of uranium and plutonium to apply a great number of solvent extraction cycles.

The separation of ruthenium from uranium and plutonium is considerably simplified by this novel ozonization treatment of the solutions, and a practically quantitative ruthenium oxidation and removal may be accomplished in one single step. This ozonization treatment also eliminates the necessity of adding dichromate or other oxidizing salt for the re-oxidation of plutonium, since plutonium is oxidized at the same time by the ozone. A third advantage obtained by the ozonization is the simultaneous oxidation of excess reducing agent used in the previous reduction-extraction of plutonium from the organic solvent, e.g., oxidation of ferrous ions to ferric ions. This oxidation is important because back-reduction of the oxidized plutonyl salts after ozone treatment is thereby prevented. All of these desirable results are obtained in one step and without the addition of any foreign ions with the exception of the relatively small quantities of a catalyst.

In the following, experiments are described in detail for the purpose of illustrating the process of this invention but not of limiting its scope.

A 10-ml. quantity of a solution containing 1.3 M aluminum nitrate, 0.05 M ferrous ion, 0.12 M sulfamic acid, 0.5 M nitric acid, 0.01 M silver nitrate, and being saturated with hexone was treated at room temperature for one hour with oxygen containing 4% ozone at a flow rate of 10 ml./min. After this treatment, all ferrous ion was found to be oxidized to the ferric state.

The same experiment was carried out with a solution identically composed as the one just described with the exception that it additionally contained 0.5 g. Pu(III)/liter. This solution was also treated at room temperature and under the same conditions described above. After twenty minutes, all iron was found to be oxidized to the trivalent state. After one hour of ozone treatment, 25% of the plutonium present was found to be in the hexavalent state and the remaining 75% in the tetravalent state, while after three hours, 54% plutonium was present in the hexavalent state.

A third experiment was then carried out with the same Pu(III)-containing solution and under the same conditions with the distinction that this time the solution was at 75° C. during ozonization. In this instance, after treatment for one hour all plutonium was found to be converted to the hexavalent state. The solution was very stable; after five days, no evidence of tetravalent plutonium was discovered.

Ten-ml. quantities of a solution being 2 M in uranyl nitrate and containing 0.1 to 0.2 g. Pu/liter, 0.3 M $HNO_3$, and 0.03 M $Co^{++}$ were treated with oxygen containing 2.5 volume percent ozone for three hours at 95° C. The oxidation of the plutonium to plutonium(VI) was found to be complete. A solution containing 1.27 M aluminum nitrate nonahydrate, 0.66 M uranyl nitrate hexahydrate, 0.2 M $HNO_3$, 0.1 g. Pu/liter, and 0.01 M $AgNO_3$, was treated with the ozone-containing oxygen for one hour at 75° C.; complete oxidation to plutonium(VI) was obtained.

Another set of experiments was carried out using, in all instances, 2.5 ml. of a solution containing 2 M $UO_2(NO_3)_2 \cdot 6H_2O$, 0.3 M $HNO_3$ and ruthenium in tracer concentration. Oxygen having an ozone content of 4% was bubbled through the solution, which had a temperature of 75° C., with a flow rate of 40 ml./min. The results are compiled in the following table.

| Catalyst | Organization Time, hrs. | Ru Retained in the Solution, Percent |
| --- | --- | --- |
| None | 1 | 22.8 |
| None | 2 | 6.2 |
| 0.01 M $AgNO_3$ | 1 | 0.2 |
| 0.01 M $AgNO_3$ | 2 | 0.003 |
| 0.01 M $Co(NO_3)_2 \cdot 6H_2O$ | 1 | 8.7 |

These results show the considerable improvement of ruthenium volatilization when silver nitrate or cobalt nitrate catalyst is used.

A study of the ruthenium removal from a 10-ml. solution containing 1.3 M aluminum nitrate nonahydrate, 0.5 M $HNO_3$, 0.05 M Fe(II), 0.1 M $H_2NSO_3H$, 0.12 g. Pu/liter, a tracer concentration of ruthenium, and 0.05 M $Ag^+$ at 92 to 95° C., using oxygen containing 2.5 to 3 volume percent of ozone at a gas flow rate of 50 ml./min., showed that the removal of the ruthenium is essentially complete with the ozone treatment in seven hours. The results are given in the following table:

| Ozonization Time, hrs. | 1 | 3 | 5 | 7 | 9.5 |
| --- | --- | --- | --- | --- | --- |
| Percent Ru left in Solution | 62.7 | 13.6 | 6.4 | 1.2 | 0.24 |

Plutonium was found to be completely oxidized to the hexavalent state after the ozone treatment.

While the process of this invention has been illustrated by examples using solutions containing tracer concentrations of ruthenium, which is from $10^{-6}$ to $10^{-14}$ M, it is applicable to macro-concentrations.

While the process of this invention has been illustrated as applied to the initial separation of uranium from plutonium and fission products by solvent extraction, it may be used for the removal of ruthenium from aqueous plutonium-containing solutions substantially free of uranium and obtained by other methods. For instance, this process may be advantageously employed for mixtures which have been obtained from uranium-plutonium-and fission-product-values-containing solutions by carrier precipitation, e.g., with bismuth phosphate, where the plutonium together with some fission product values including ruthenium is carried by the precipitate. The ruthenium may be efficiently removed from the solution obtained from the carrier precipitate by the process of this invention.

It will be understood that this invention is not to be limited to the details given herein but that it may be modified within the scope of the appended claims.

What is claimed is:

1. A process of separating plutonium values from uranium values and fission product values including ruthenium values contained in an aqueous solution, comprising adding an oxidizing agent for plutonium to said solution whereby it is converted to the hexavalent state; contacting said solution with a substantially water-immiscible organic solvent selected from the group consisting of ethers, esters including alkyl phosphates, ketones, alcohols, nitrohydrocarbons and alkyl sulfides whereby the plutonyl values formed, the uranyl values and part of said fission product values are extracted into a solvent phase; separating said solvent phase from an aqueous phase; contacting said solvent phase with an aqueous scrub solution containing a reducing agent for plutonium and mineral acid anions as a salting-out agent whereby said plutonyl values are reduced to the trivalent state and back-extracted into a strip solution, leaving the uranium values in the organic phase; introducing ozone into said strip solution whereby the plutonium values are oxidized to the hexavalent state and the ruthenium values are oxidized to ruthenium tetroxide and volatilized as such.

2. The process of claim 1 wherein the aqueous solution to be processed is an acid solution.

3. The process of claim 2 wherein the solution to be processed is a nitric acid solution.

4. The process of claim 1 wherein the oxidizing agent is a water-soluble dichromate.

5. The process of claim 1 wherein the water-immiscible organic solvent is hexone.

6. The process of claim 1 wherein the ozone is diluted with a gas nonreacting with the ozone.

7. The process of claim 6 wherein the diluent gas is oxygen.

8. The process of claim 6 wherein the diluent gas is nitrogen.

9. The process of claim 6 wherein the diluent gas is air.

10. The process of claim 1 wherein the reducing agent in the scrub solution is a ferrous salt.

11. The process of claim 10 wherein the ferrous salt is ferrous sulfamate.

12. The process of claim 1 wherein an oxidizing catalyst is added to the strip solution prior to the introduction of ozone, said catalyst being selected from the group consisting of permanganate, dichromate, silver salt, ceric salt, cobalt salt, nickel salt, periodate, bromate and lead dioxide.

13. The process of claim 12 wherein the oxidation catalyst is present in a concentration of between 0.001 and 0.1 M.

14. The process of claim 13 wherein the oxidation catalyst is permanganate.

15. The process of claim 13 wherein the oxidation catalyst is a silver salt.

16. The process of claim 13 wherein the oxidation catalyst is a ceric salt.

17. The process of claim 13 wherein the oxidation catalyst is a cobalt salt.

18. The process of claim 13 wherein the oxidation catalyst is a dichromate.

19. The process of claim 1 wherein the solution is heated up to 95° C. prior to introducing ozone.

20. A process of separating ruthenium values from plutonium values contained in an aqueous solution, comprising introducing ozone into said solution whereby plutonium is oxidized to the hexavalent state and ruthenium is oxidized to ruthenium tetroxide and volatilized as such.

No references cited.